United States Patent
Zhu et al.

(10) Patent No.: US 12,455,822 B2
(45) Date of Patent: Oct. 28, 2025

(54) METHOD AND DEVICE FOR SELECTING CACHE LINE TO BE REPLACED, AND STORAGE MEDIUM

(71) Applicant: Glenfly Tech Co., Ltd., Shanghai (CN)

(72) Inventors: Ziwen Zhu, Shanghai (CN); Wenjie Wu, Shanghai (CN); Jing Feng, Shanghai (CN); Pengcheng Yu, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 143 days.

(21) Appl. No.: 18/178,065

(22) Filed: Mar. 3, 2023

(65) Prior Publication Data

US 2023/0281125 A1 Sep. 7, 2023

(30) Foreign Application Priority Data

Mar. 4, 2022 (CN) .......................... 202210214699.6

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC .......................... G06F 12/0802; G06F 2212/60
See application file for complete search history.

(56) References Cited

U.S. PATENT DOCUMENTS

| | | |
|---|---|---|
| 2005/0055506 A1 | 3/2005 | DeMent et al. |
| 2009/0113137 A1* | 4/2009 | Grayson ............... G06F 12/128 711/136 |
| 2009/0182952 A1* | 7/2009 | Moyer .................. G06F 12/126 711/E12.001 |
| 2018/0095875 A1* | 4/2018 | Zhang ................. G06F 12/0864 |
| 2020/0379854 A1* | 12/2020 | Zubair ................ G06F 12/0875 |

FOREIGN PATENT DOCUMENTS

| | | |
|---|---|---|
| CN | 108182153 A | 6/2018 |
| CN | 109933543 A | 6/2019 |
| CN | 110018971 A | 7/2019 |
| CN | 110362506 A | 10/2019 |
| CN | 111522509 A | 8/2020 |

(Continued)

OTHER PUBLICATIONS

Zhang et al., "PAC-PLRU: A Cache Replacement Policy to Salvage Discarded Predictions from Hardware Prefetchers", International Symposium on Cluster, Cloud and Grid Computing, 2011, 11 pages May 2011.

(Continued)

*Primary Examiner* — Eric T Loonan
(74) *Attorney, Agent, or Firm* — Dority & Manning, PA

(57) ABSTRACT

The present disclosure relates to the computer technology and provides a method and a device for selecting a cache line to be replaced, and a storage medium. In the present disclosure, a blocking state binary tree is added to replace a replacement state binary tree, and a cache line to be replaced is selected based on the blocking state binary tree and a usage state binary tree, such that the earliest cache line, acting as the cache line to be replaced, can be accurately selected from the replaceable cache lines in a blocking cache.

6 Claims, 6 Drawing Sheets

(56) References Cited

FOREIGN PATENT DOCUMENTS

| CN | 112363958 A | 2/2021 |
|---|---|---|
| CN | 112948283 A | 6/2021 |

OTHER PUBLICATIONS

Office Action (with English translation) received in corresponding Application No. CN 202210214699.6, dated Apr. 19, 2024, 13 pages.
Li-Min et al., "An Optimized Pseudo-LRU Replacement Algorithm", English abstract only, Microelectronics & Computer, vol. 26, No. 1, Jun. 2009, 5 pages.
Hong et al., "The Design of PLRU Cache in Embedded System", English abstract only, Microprocessors, Feb. 2010, 4 pages.

* cited by examiner

METHOD AND DEVICE FOR SELECTING CACHE LINE TO BE REPLACED, AND STORAGE MEDIUM

CROSS-REFERENCE TO RELATED APPLICATIONS

The present application claims priority of Chinese Patent Application No. 2022102146996, entitled "METHOD AND DEVICE FOR SELECTING CACHE LINE TO BE REPLACED", filed on Mar. 4, 2022, the entire content of which is incorporated herein by reference.

TECHNICAL FIELD

The present disclosure relates to the computer technology, and in particular, to a method and a device for selecting a cache line to be replaced, and a storage medium.

BACKGROUND

A well-designed cache can greatly increase the speed of memory access and significantly reduce the pressure on the storage bandwidth. The replacement algorithm used in the cache structure can greatly affect the hit performance of the cache.

SUMMARY

In a first aspect, the present disclosure provides a method for selecting a cache line to be replaced. In the method, a state of a root node of a usage state binary tree corresponding to a blocking cache system is checked. The root node of the usage state binary tree is taken as a current parent node of the usage state binary tree if the state of the root node of the usage state binary tree is a first state. A left child node of the current parent node of the usage state binary tree is taken as a new current parent node of the usage state binary tree if a state of the left and right child nodes of the current parent node of the usage state binary tree is a first substate. A right child node of the current parent node of the usage state binary tree is taken as the new current parent node of the stage state binary tree if the state of the left and right child nodes of the current parent node of the usage state binary tree is a second substate. The current parent node of the usage state binary tree is mapped to a corresponding current parent node of a blocking state binary tree corresponding to the blocking cache system if the state of the left and right child nodes of the current parent node of the stage state binary tree is a third sub state. A left child node of the current parent node of the blocking state binary tree is taken as a new current parent node of the blocking state binary tree if a state of the current parent node of the blocking state binary tree is a third state. A right child node of the current parent node of the blocking state binary tree is taken as the new current parent node of the blocking state binary tree if the state of the current parent node of the blocking state binary tree is a fourth state. The new current parent node of the blocking state binary tree is mapped back to the corresponding current parent node of the usage state binary tree. The steps of selecting the current parent node of the usage state binary tree and selecting the current parent node of the blocking state binary tree are repeated until there is no child node in the current parent node of the usage state binary tree to obtain the cache line to be replaced in the blocking cache system.

In one of the embodiments, after checking the state of the root node of the usage state binary tree corresponding to the blocking cache system, the method further includes determining that no cache line can be replaced in the blocking cache system and continuing to check the state of the root node of the usage state binary tree if the state of the root node of the usage state binary tree is a second state.

In one of the embodiments, the states of the nodes of the usage state binary tree are determined according to replaceable states of cache lines in the blocking cache system.

In one of the embodiments, the states of the nodes of the blocking state binary tree are determined according to states of nodes of a corresponding replacement state binary tree of the blocking cache system and replaceable states of cache lines in the blocking cache system.

In one of the embodiments, the method further includes updating the states of the nodes of the usage state binary tree and the states of the nodes of the blocking state binary tree after the cache line to be replaced in the blocking cache system is selected.

In a second aspect, the present disclosure further provides a device for selecting a cache line to be replaced. The device includes one or more memories and one or more processors. One or more programs are stored in the one or more memories, and when the one or more programs are executed by the one or more processors, a method of selecting a cache line to be replaced is performed. The method includes the following steps. Checking a state of a root node of a usage state binary tree corresponding to a blocking cache system. Taking the root node of the usage state binary tree as a current parent node of the usage state binary tree if the state of the root node of the usage state binary tree is a first state. Taking a left child node of the current parent node as a new current parent node of the usage state binary tree if a state of the left and right child nodes of the current parent node of the usage state binary tree is a first sub state, taking a right child node of the current parent node as the new current parent node of the usage state binary tree if the state of the left and right child nodes of the current parent node of the usage state binary tree is a second substate, and mapping the current parent node of the usage state binary tree to the corresponding current parent node of the blocking state binary tree corresponding to the blocking cache system if the state of the left and right child node of the current parent node of the usage state binary tree is a third sub state. Taking the left child node of the current parent node of the blocking state binary tree as the new current parent node of the blocking state binary tree if the state of the current parent node of the blocking state binary tree is a third state, taking the right child node of the current parent node of the blocking state binary tree as the new current parent node of the blocking state binary tree if the state of the current parent node of the blocking state binary tree is a fourth state, and mapping the new current parent node of the blocking state binary tree back to the corresponding current parent node of the usage state binary tree. Repeating the steps of selecting the current parent node of the usage state binary tree and selecting the current parent node of the blocking state binary tree until there is no child node in the current parent node of the usage state binary tree to obtain the cache line to be replaced in the blocking cache system.

In one of the embodiments, the method further includes determining that no cache line can be replaced in the blocking cache system and continue to check the state of the root node of the usage state binary tree if the state of the root node of the usage state binary tree is a second state.

In one of the embodiments, the states of the nodes of the usage state binary tree are determined according to replaceable states of cache lines in the blocking cache system.

In one of the embodiments, the states of the nodes of the blocking state binary tree are determined according to states of nodes of a corresponding replacement state binary tree of the blocking cache system and replaceable states of cache lines in the blocking cache system.

In one of the embodiments, the method further includes updating the state of the nodes of the usage state binary tree and the states of the nodes of the blocking state binary tree after the cache line to be replaced in the blocking cache system is selected.

In a third aspect, the present disclosure provides a non-transitory computer-readable storage medium, on which a computer program is stored. When the computer program is executed by a processor, steps of the method for selecting the cache line to be replaced according to any one of the embodiments in the first aspect are performed.

DETAILED DESCRIPTION OF THE EMBODIMENTS

In order to make the purpose, technical solutions and advantages of the present disclosure more clear, the present disclosure will be further described in detail below with reference to the accompanying drawings and embodiments. It should be understood that the specific embodiments described herein are only used to explain the present disclosure, but not to limit the present disclosure.

Commonly used cache replacement algorithms in current cache systems include the FIFO (First in First out), the LRU (Least Recently Used), the RANDOM and the PLRU (Pseudo LRU). The FIFO algorithm and the RANDOM algorithm are simple to implement in hardware but have poor performance. The LRU algorithm can always find the earliest used cache line for replacement and has better performance, but the hardware design thereof is complex and consumes a lot of hardware resources, and the time sequence is difficult to converge. The PLRU algorithm, compared to the LRU algorithm, can use less hardware resources to achieve better performance.

However, the PLRU algorithm utilizes binary tree structures to store historical access information of the cache lines. If the cache line pointed by a replacement state binary tree has not yet been released, the latest cache line may be selected to be replaced, thereby affecting the performance of the cache.

In a caching system based on blocking cache, a traditional method is to select a cache line to be replaced by a replacement state binary tree in conjunction with a usage state binary tree. By using such a method, the latest cache line may be selected to be replaced, thereby reducing the performance of the cache. In a method for selecting a cache line to be replaced provided by the present disclosure, the cache line to be replaced can be selected based on both a newly added blocking state binary tree and a usage state binary tree, which can alleviate the above problems and improve the performance of the cache.

Figure 1:
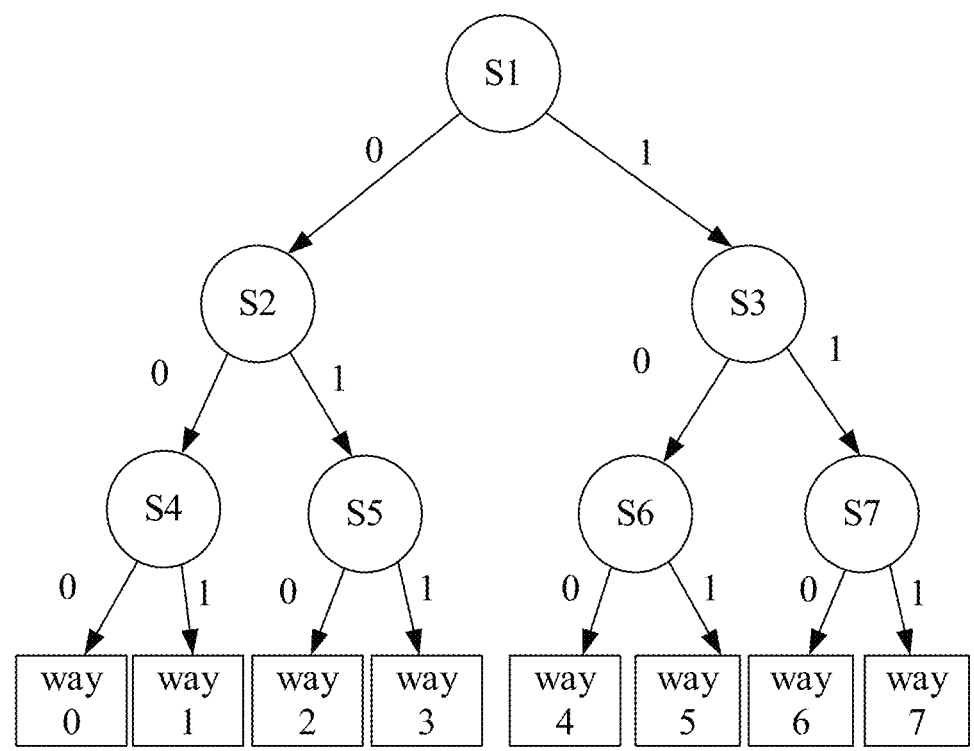
FIG. 1 is a schematic diagram of a replacement state binary tree according to an example of prior art.

In an existing blocking cache system, the cache line to be replaced is determined by using the replacement state binary tree and the usage state binary tree. The following sections of the present disclosure will be illustrated with 8-way cache lines. As shown in FIG. 1, seven node state bits $S1 \sim S7$ are utilized to record the historical access information of the cache lines. For the convenience of description, the replacement state binary tree is referred to as a S-tree hereinafter. The cache line to be replaced is specified completely by the S-tree if all cache lines are available. The rules for specifying the cache line to be replaced are shown in Table 1 below. Taking the cache line way0 being selected as an example, the left half of the replacement state binary tree shown in FIG. 1 is selected if the state of the root node S1 is 0, and then the state of the node S2 is determined and the state of the node S3 is ignored. The node S4 is selected for determination if the state of the node S2 is 0. The cache line way0 is selected as the cache line to be replaced for replacement if the state of the node S4 is 0.

TABLE 1

| S1 | S2 | S3 | S4 | S5 | S6 | S7 | Cache line to be replaced |
|----|----|----|----|----|----|----|--------------------------|
| 0  | 0  | X  | 0  | X  | X  | X  | way0 |
| 0  | 0  | X  | 1  | X  | X  | X  | way1 |
| 0  | 1  | X  | X  | 0  | X  | X  | way2 |
| 0  | 1  | X  | X  | 1  | X  | X  | way3 |
| 1  | X  | 0  | X  | X  | 0  | X  | way4 |
| 1  | X  | 0  | X  | X  | 1  | X  | way5 |
| 1  | X  | 1  | X  | X  | X  | 0  | way6 |
| 1  | X  | 1  | X  | X  | X  | 1  | way7 |

After the appropriate cache line or cache hit is selected, the information of the nodes $S1 \sim S7$ of the S-tree needs to be updated. The update rules are shown in Table 2 below. Continuing to take the cache line way0 being replaced or hit as an example, the states of the nodes S1, S2, and S4 in the replacement state binary tree shown in FIG. 1 are changed to 1, while the remaining nodes remain unchanged.

TABLE 2

| Cache line that is currently replaced or hit | Updated state | | | | | | |
|---|---|---|---|---|---|---|---|
|  | S1 | S2 | S3 | S4 | S5 | S6 | S7 |
| way0 | 1 | 1 | No change | 1 | No change | No change | No change |

TABLE 2-continued

| Cache line that is currently replaced or hit | Updated state | | | | | | |
|---|---|---|---|---|---|---|---|
| | S1 | S2 | S3 | S4 | S5 | S6 | S7 |
| way1 | 1 | 1 | No change | 0 | No change | No change | No change |
| way2 | 1 | 0 | No change | No change | 1 | No change | No change |
| way3 | 1 | 0 | No change | No change | 0 | No change | No change |
| way4 | 0 | No change | 1 | No change | No change | 1 | No change |
| way5 | 0 | No change | 1 | No change | No change | 0 | No change |
| way6 | 0 | No change | 0 | No change | No change | No change | 1 |
| way7 | 0 | No change | 0 | No change | No change | No change | 0 |

Figure 2:
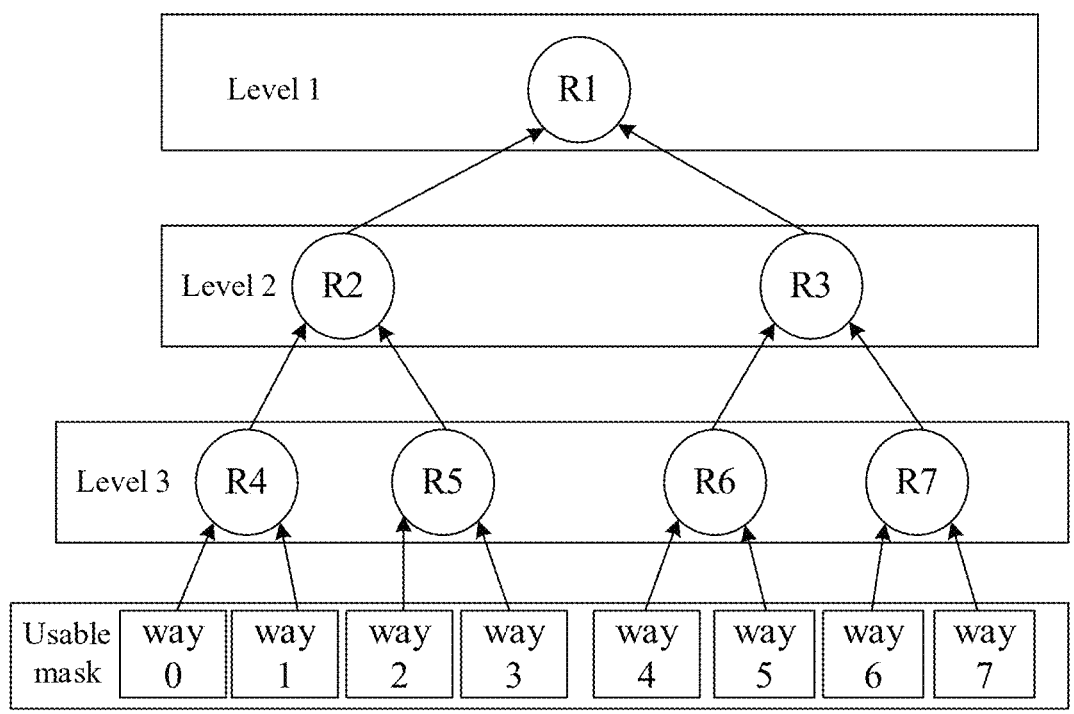
FIG. 2 is a schematic diagram of a usage state binary tree according to an example of prior art.

In the blocking cache system, when a cache line is in use and has not been released, the cache line will be locked and not allowed to be replaced. The locked cache line cannot be selected and replaced. Therefore, a usage state binary tree is required for the selection of the cache line to be replaced. A structure of the usage state binary tree is shown in FIG. 2. For the convenience of description, the usage state binary tree is referred to below as the R-tree. The state information of each node in the Level 3 of the R-tree is obtained from the Usable mask of each cache line. The state of the node R4, for example, is 1 if the cache line way0 or way1 can be replaced. Similarly, the states of the nodes R5, R6, and R7 are determined according to the replaceable states of the corresponding cache lines, respectively. Similarly, the state information of each node in the Level 2 is obtained according to the state information of each node in the Level 3. The generation and update rules of each node of the R-tree are shown in Table 3 below.

TABLE 3

| Nodes | Update rules |
|---|---|
| R1 | R2 \| R3 |
| R2 | R4 \| R5 |
| R3 | R6 \| R7 |
| R4 | Way0_usable \| Way1_usable |
| R5 | Way2_usable \| Way3_usable |
| R6 | Way4_usable \| Way5_usable |
| R7 | Way6_usable \| Way7_usable |

In the blocking cache system, the replacement method used in the PLRU includes the following steps.

At step 1, the state of the root node R1 of the R-tree is checked. It indicates that no cache line is replaceable if the state of the root node R1 is 0, thus the cache system should be blocked. The root node R1 is taken as the parent node if the state of the root node R1 is 1.

At step 2, the left and right child nodes of the current parent node of the R-tree are checked. The left child node is selected as a new parent node if the states of the left and right child nodes are 1 and 0 respectively. The right child node is selected as the new parent node if the states of the left and right child nodes are 0 and 1 respectively. The current parent node of the R-tree is mapped to the corresponding parent node of the S-tree if the states of the left and right child nodes are 1 and 1 respectively. If the state of the corresponding parent node of the S-tree is 0, the left child node of the corresponding parent node of the S-tree is selected as a new parent node. If the state of the corresponding parent node of the S-tree is 1, the right child node of the corresponding parent node of the S-tree is selected as the new parent node. Then, the new parent node of the S-tree is mapped back to the parent node of the R-tree.

At step 3, the step 2 is repeated until there is no child node in the parent node of the R-tree, so that the cache line that needs to be replaced is selected.

However, there is a major problem in the traditional method as described above. Since each parent node only focuses on the states of its next-level child nodes, the cache lines that have been newly replaced may be selected when selecting the cache line to be replaced, while those cache lines that have not been accessed for a relatively long time are not selected to be replaced, thereby greatly affecting the performance of the caching system.

Figure 3:
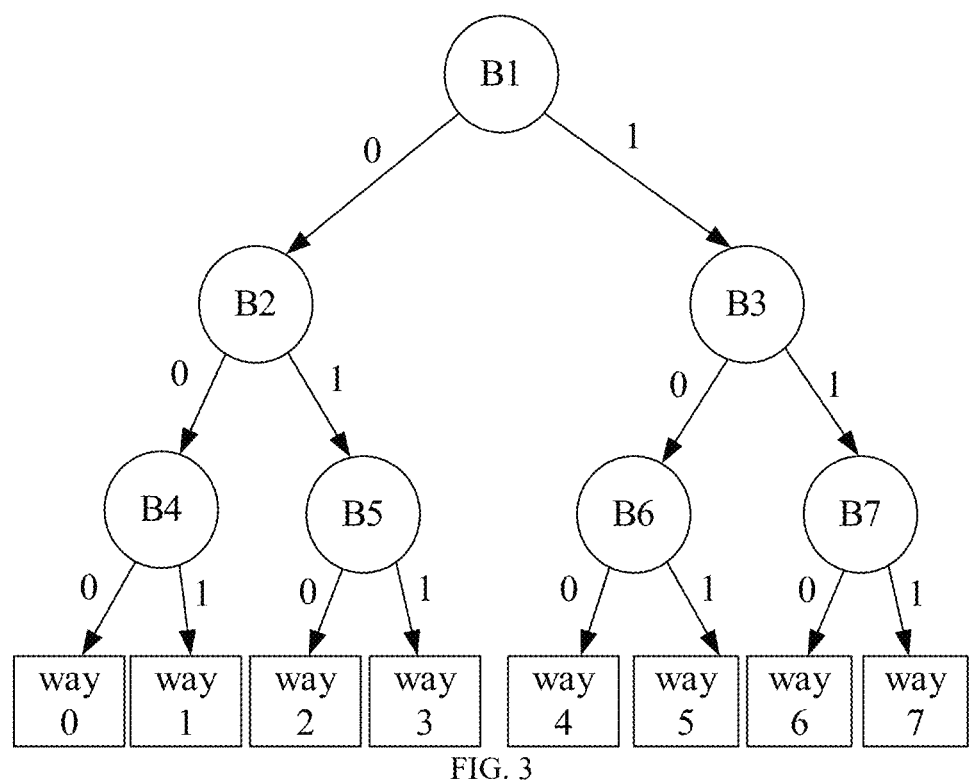
FIG. 3 is a schematic diagram of a blocking state binary tree according to an embodiment.

The present disclosure proposes to add a blocking state binary tree. A structure of the blocking state binary tree is shown in FIG. 3, and the generation and update rules of the nodes of the blocking state binary tree are shown in Table 4 below. The blocking state binary tree is referred to as B-tree hereinafter.

TABLE 4

| Nodes | Update rules |
|---|---|
| B1 | (S1 & (~C2 \| C3)) \| (~C2 & C3) |
| B2 | (S2 & (~C4 \| C5)) \| (~C4 & C5) |
| B3 | (S3 & (~C6 \| C7)) \| (~C6 & C7) |
| B4 | (S4 & (~Way0_usable \| Way1_usable)) \| (~Way0_usable & Way1_usable) |
| B5 | (S5 & (~Way2_usable \| Way3_usable)) \| (~Way2_usable & Way3_usable) |
| B6 | (S6 & (~Way4_usable \| Way5_usable)) \| (~Way4_usable & Way5_usable) |
| B7 | (S7 & (~Way6_usable \| Way7_usable)) \| (~Way6_usable & Way7_usable) |
| C2 | (~S2 & c4) \| (S2 & c5) |
| C3 | (~S3 & c6) \| (S3 & c7) |
| C4 | (~S4 & way0_usable) \| (S4 & way1_usable) |
| C5 | (~S5 & way2_usable) \| (S5 & way3_usable) |
| C6 | (~S6 & way4_usable) \| (S6 & way5_usable) |
| C7 | (~S7 & way6_usable) \| (S7 & way7_usable) |

Figure 4:
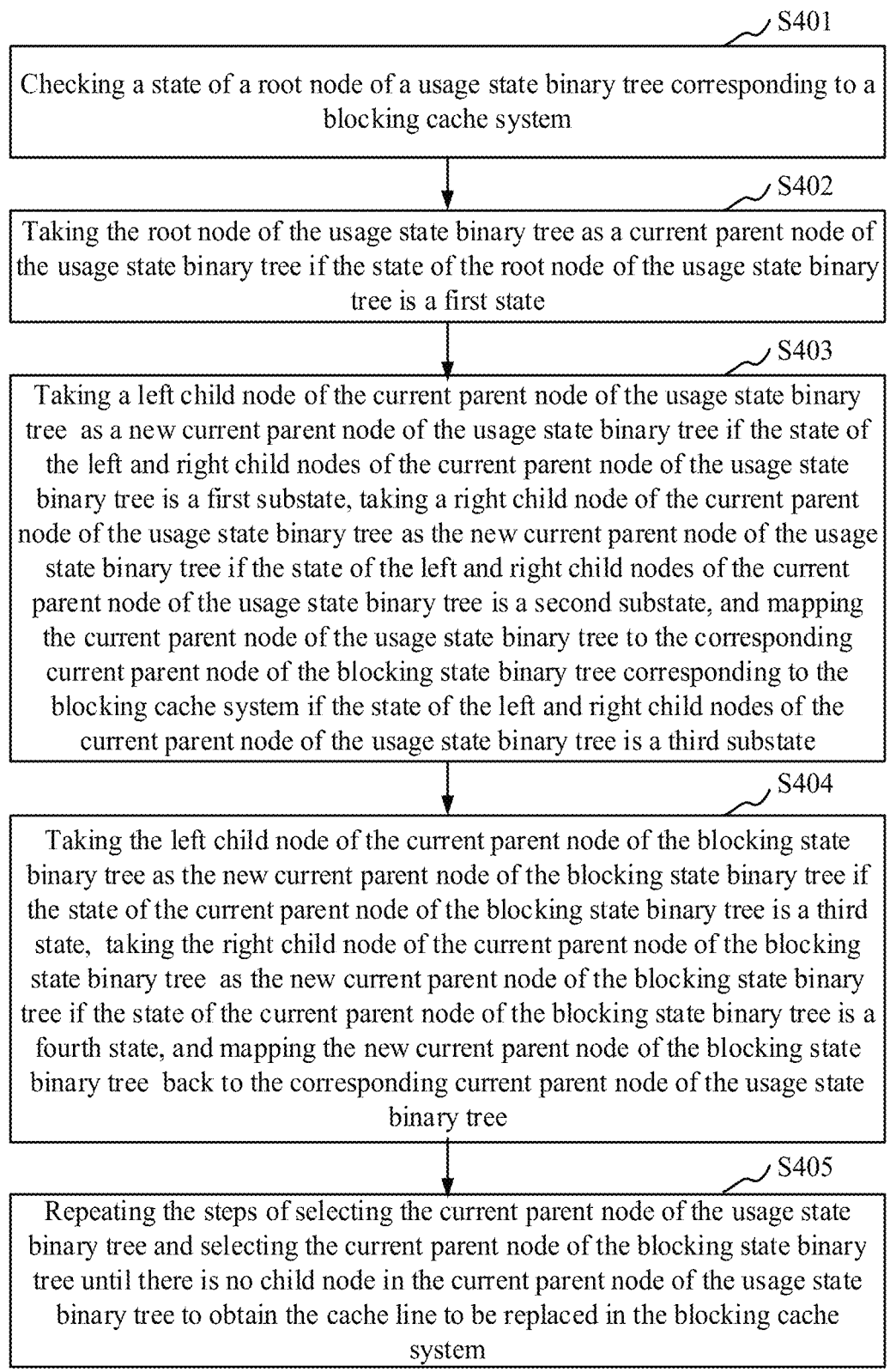
FIG. 4 is a schematic diagram of a flowchart of a method for selecting a cache line to be replaced according to an embodiment.

Based on the blocking state binary tree, in an embodiment, as shown in FIG. 4, the present disclosure provides a method for selecting a cache line to be replaced. The method includes the following steps.

At step S401, a state of a root node of a usage state binary tree corresponding to a blocking cache system is checked.

In this step, the state of the root node R1 of the usage state binary tree R corresponding to the blocking cache system is checked. In an embodiment, after checking the state of the root node R1, if the state of the root node R1 of the usage state binary tree R is a second state (i.e., the state of the root node R1 is 0), it is determined that no cache line can be replaced in the blocking cache system, which indicates that no cache line is replaceable in the blocking cache system, such that the state of the root node R1 of the usage state binary tree R is continued to be checked.

At step S402, the root node of the usage state binary tree is taken as a current parent node of the usage state binary tree if the state of the root node of the usage state binary tree is a first state.

In this step, the root node R1 of the usage state binary tree R is taken as the current parent node of the usage state binary tree R if the state of the root node R1 is the first state (i.e., the state of the root node R1 is 1).

At step S403, a left child node of the current parent node of the usage state binary tree is taken as a new current parent node of the usage state binary tree if the state of the left and right child nodes of the current parent node of the usage state binary tree is a first sub state, a right child node of the current parent node of the usage state binary tree is taken as the new current parent node of the usage state binary tree if the state of the left and right child nodes of the current parent node of the usage state binary tree is a second sub state, and the current parent node of the usage state binary tree is mapped to the corresponding current parent node of the blocking state binary tree corresponding to the blocking cache system if the state of the left and right child nodes of the current parent node of the usage state binary tree is a third sub state.

This step involves selecting the current parent node based on the usage state binary tree, which includes three cases. In the first case, if the state of the left and right child nodes of the current parent node of the usage state binary tree R is the first sub state (i.e., the states of the left and right child nodes are 1 and 0 respectively), the left child node of the current parent node is taken as the new current parent node of the usage state binary tree R. In the second case, if the state of the left and right child nodes of the current parent node of the usage state binary tree R is the second sub state (i.e., the states of the left and right child nodes are 0 and 1 respectively), the right child node of the current parent node is taken as the new current parent node of the usage state binary tree R. In the third case, if the state of the left and right child nodes of the current parent node of the usage state binary tree R is the third substate (i.e., the states of the left and right child nodes are 1 and 1 respectively), the current parent node of the usage state binary tree R is mapped to the corresponding current parent node of the blocking state binary tree B corresponding to the blocking cache system.

At step S404, the left child node of the current parent node of the blocking state binary tree is taken as the new current parent node of the blocking state binary tree if the state of the current parent node of the blocking state binary tree is a third state, the right child node of the current parent node of the blocking state binary tree is taken as the new current parent node of the blocking state binary tree if the state of the current parent node of the blocking state binary tree is a fourth state, and the new current parent node of the blocking state binary tree is mapped back to the corresponding current parent node of the usage state binary tree.

This step involves selecting the current parent node based on the blocking state binary tree B, which includes two cases. In the first case, if the state of the current parent node of the blocking state binary tree B is the third state (i.e., the state of the current parent node is 0), the left child node of the current parent node of the blocking state binary tree B is taken as the new current parent node of the blocking state binary tree B. In the second case, if the state of the current parent node of the blocking state binary tree B is the fourth state (i.e., the state of the current parent node is 1), the right child node of the current parent node of the blocking state binary tree B is taken as the new current parent node of the blocking state binary tree B. After the new current parent node is selected in either of the two cases, the new current parent node of the blocking state binary tree B is mapped back to the corresponding current parent node of the usage state binary tree R.

At step S405, the steps of selecting the current parent node of the usage state binary tree and selecting the current parent node of the blocking state binary tree are repeated until there is no child node in the current parent node of the usage state binary tree, so that the cache line to be replaced in the blocking cache system is obtained.

Figure 5:
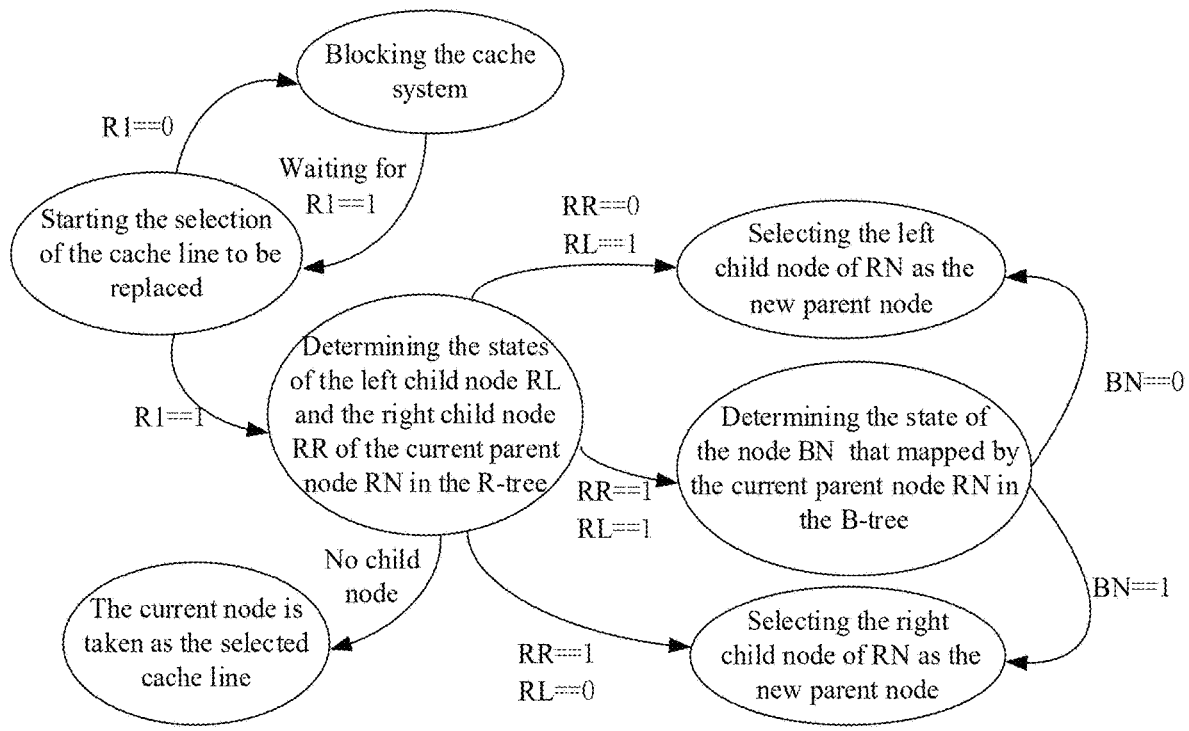
FIG. 5 is a schematic state transition diagram of a method for selecting a cache line to be selected according to an embodiment.

The steps of selecting the current parent nodes of the usage state binary tree and the blocking state binary tree in steps S403 and S404 are repeated until there is no child node in the current parent node of the usage state binary tree, thus the cache line to be replaced is selected. The state transition diagram of the method for selecting the cache line to be replaced provided by the present disclosure is shown in FIG. 5.

Figure 6:
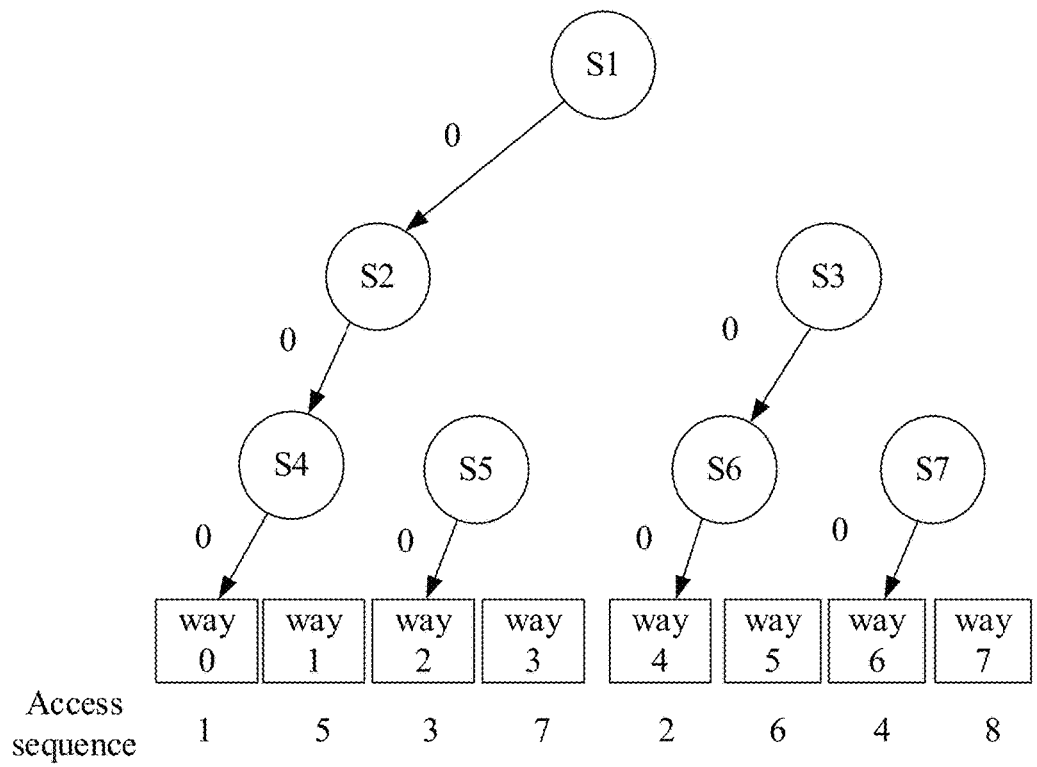
FIG. 6 is a schematic diagram showing a state of a replacement state binary tree according to an embodiment.
Figure 7:
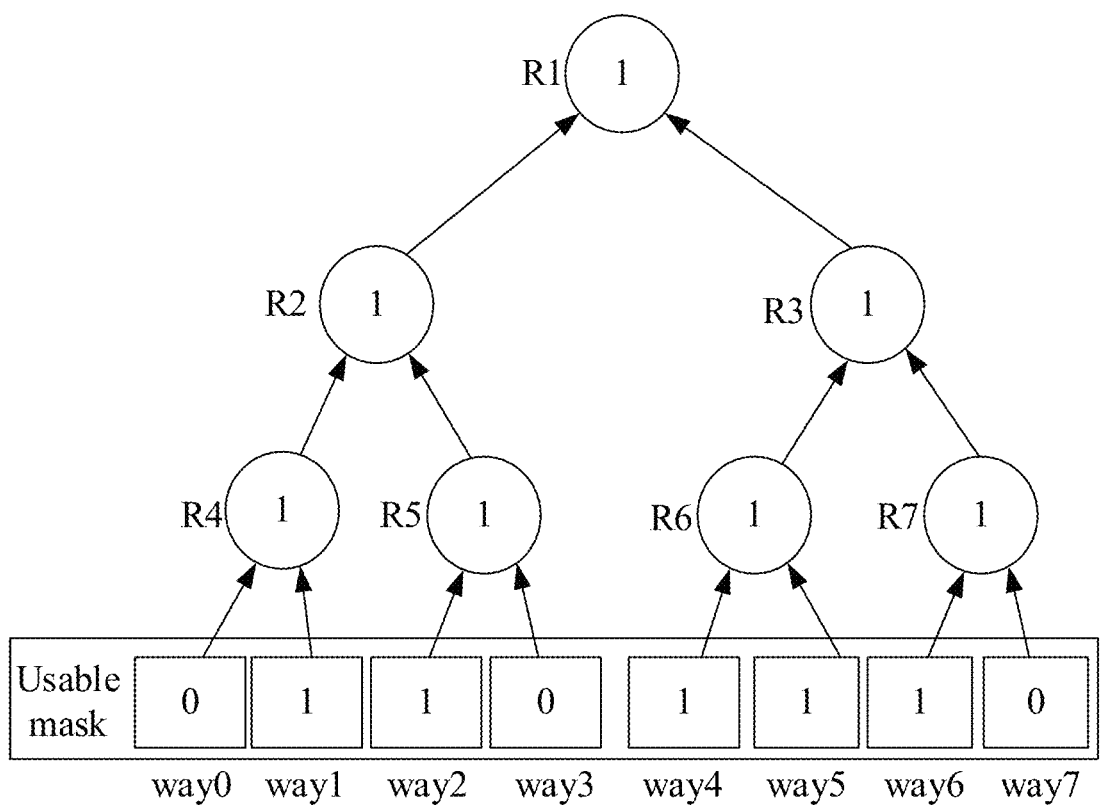
FIG. 7 is a schematic diagram showing a state of a usage state binary tree according to an embodiment.

Next, an example will be shown to illustrate the difference between the traditional algorithm and the method for selecting the cache line provided by the present disclosure. FIG. 6 shows the state of each node in the S-tree after a first round of accesses of the 8-way cache system. It can be seen that the earliest used cache line is way0, followed by the cache lines way4, way2, way6, way1, way5, and way3, and the latest used cache line is way7. At this point, the S-tree points to way0. FIG. 7 shows the state of the R-tree. In FIG. 7, the cache lines way0, way3, and way7 are in use and cannot be replaced, and the remaining cache lines can be replaced.

Based on the above, selecting the cache line using the traditional algorithm includes the following steps.

At step 1, first starting from the node R1 of the R-tree, since the states of both the node R2 and the node R3 are 1, the node R2 is selected based on the state of the node S1 of the S-tree being 0.

At step 2, starting from the node R2 of the R-tree, since the states of both the node R4 and the node R5 are 1, the node R4 is selected based on the state of the node S2 of the S-tree being 0.

At step 3, starting from the node R4 of the R-tree, since only the cache line way1 is 1 among the cache lines way0 and way1, the cache line way1 is selected as the cache line to be replaced.

It can be seen that the cache line found by the traditional algorithm actually is a recently replaced cache line, which may affect the performance of the cache.

Figure 8:
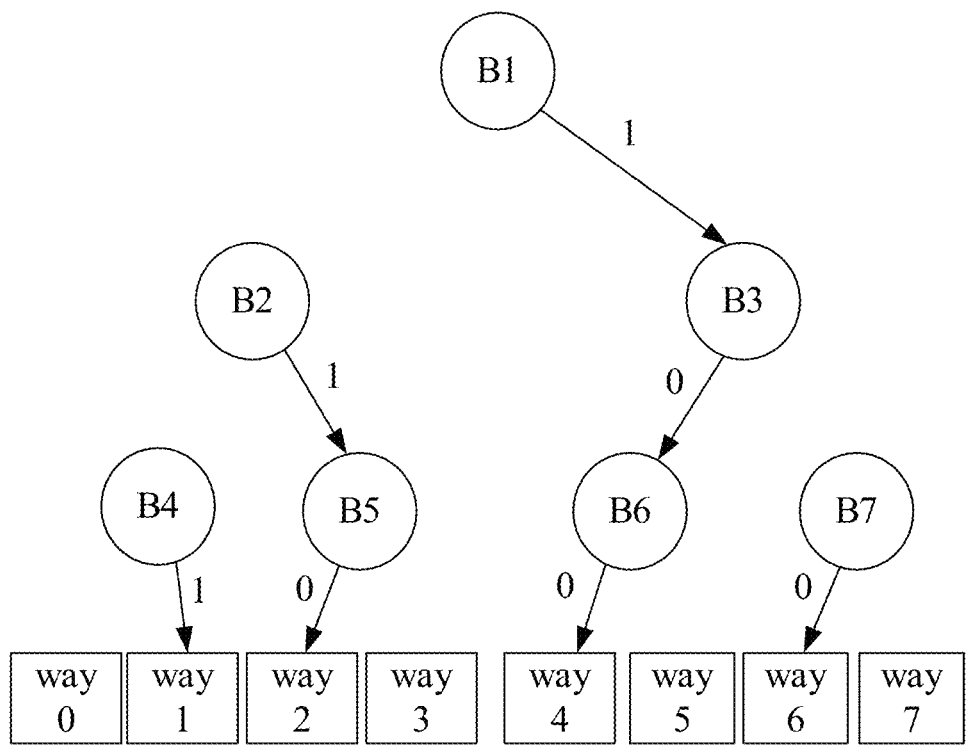
FIG. 8 is a schematic diagram showing a state of a blocking state binary tree according to an embodiment.

The method provided by the present disclosure will be described as follows. FIG. 8 shows the state of the blocking state binary tree B.

The method for selecting the cache line to be replaced provided by the present disclosure includes the following steps.

At step 1, first starting from the node R1 of the R-tree, since the states of both the node R2 and the node R3 are 1, the node R3 is selected based on the state of the node B1 of the B-tree being 1.

At step 2, starting from the node R3 of the R-tree, since the states of both the node R6 and the node R7 are 1, the node R6 is selected based on the state of the node B3 of the B-tree being 0.

At step 3, starting from the node R6 of the R-tree, since both the cache lines way4 and way5 are 1, the cache line way4 is selected as the cache line to be replaced based on the state of the node B6 of the B-tree being 0.

It can be seen that the earliest cache line can be found among the replaceable cache lines by the method provided by the present disclosure.

In the above method for selecting the cache line to be selected provided by the embodiments of the present disclosure, the blocking state binary tree is added to replace the replacement state binary tree, and the cache line to be replaced is selected according to the blocking state binary tree and the usage state binary tree. Therefore, the earliest cache line can be accurately identified, among the replaceable cache lines in the blocking cache, as the cache line to be replaced at a smaller cost, which is more beneficial to the temporal and spatial continuity of the memory access and improves the hit rate of the caching system.

In an embodiment, the states of the nodes in the usage state binary tree are determined according to the replaceable states of the cache lines in the blocking cache system. Specifically, the states of the nodes in the usage state binary tree R can be determined according to Table 3 as described above.

In an embodiment, the states of the nodes in the blocking state binary tree are determined according to the states of the nodes in the replacement state binary tree corresponding to the blocking cache system and the replaceable states of the cache lines in the blocking cache system. Specifically, the states of the nodes in the blocking state binary tree B can be determined according to Table 4 as described above.

In an embodiment, the method further includes: updating the states of the nodes in the usage state binary tree and the blocking state binary tree after the cache line to be replaced in the blocking cache system is selected. Specifically, after the cache line to be replaced in the blocking cache system is selected, the states of the nodes in the usage state binary tree R and the states of the nodes in the blocking state binary tree B can be updated according to the above Table 3 and Table 4, respectively.

In general, in the present disclosure, the request entering the cache system can be matched with the cached data by a unique identifier of each cache line, and it is considered a hit if the request matches with one of the cached data, otherwise it is considered a miss. Thus, the request entering the cache system is matched with the unique identifiers first. The data can be obtained directly from the cache line if it is hit, otherwise, a request needs to be sent to the memory, and a cache line needs to be selected in the cache system to store the data returned from the memory. After each miss/hit or the cache line is used, the R-tree and the S-tree are updated according to the usage state and the miss/hit situation of the current cache line, and then the B-tree can be obtained according to the R-tree and S-tree. Finally, when selecting the cache line for the miss request, the cache line to be replaced is selected by the R-tree and B-tree, thus the earliest cache line can be found from the replaceable cache lines more accurately in the present disclosure. It can be seen that, in the present disclosure, the blocking state binary tree is added to replace the replacement state binary tree, thus the earliest cache line can be accurately identified, among the replaceable cache lines in the blocking cache, as the cache line to be replaced at a smaller cost, which is more beneficial to the temporal and spatial continuity of the memory access and improves the hit rate of the caching system.

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Based on the same concept, the embodiments of the present disclosure also provide a device for selecting a cache line to be replaced, which is configured to implement the method for selecting the cache line to be replaced as described above. The solution provided by the device for solving the problem is similar to the solution in the method as described above, therefor the specific features in one or more embodiments of the device for selecting the cache line to be replaced provided below can be referred to the features of the above method for selecting the cache line to be replaced and will not be repeated here.

Figure 9:
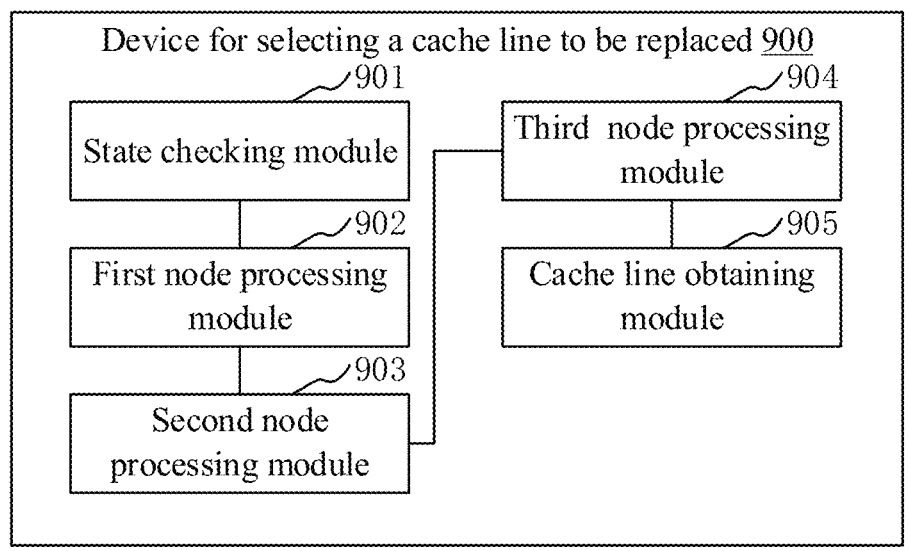
FIG. 9 is a block diagram of a structure of a device for selecting a cache line to be replaced according to an embodiment.

In an embodiment, as shown in FIG. 9, a device for selecting a cache line to be replaced is provided. The device includes a state checking module 901, a first node processing module 902, a second node processing module 903, a third node processing module 904, and a cache line obtaining module 905.

The state checking module 901 is configured to check a state of a root node of a usage state binary tree corresponding to a blocking cache system.

The first node processing module 902 is configured to take the root node of the usage state binary tree as a current parent node of the usage state binary tree if the state of the root node of the usage state binary tree is a first state.

The second node processing module 903 is configured to take a left child node of the current parent node of the usage state binary tree as a new current parent node of the usage state binary tree if the state of the left and right child nodes of the current parent node of the usage state binary tree is a first substate, take a right child node of the current parent node of the usage state binary tree as the new current parent node of the usage state binary tree if the state of the left and right child nodes of the current parent node of the usage state binary tree is a second sub state, and map the current parent node of the usage state binary tree to the corresponding current parent node of the blocking state binary tree corresponding to the blocking cache system if the state of the left and right child node of the current parent node of the usage state binary tree is a third substate.

The third node processing module 904 is configured to take the left child node of the current parent node of the blocking state binary tree as the new current parent node of the blocking state binary tree if the state of the current parent node of the blocking state binary tree is a third state, take the right child node of the current parent node of the blocking state binary tree as the new current parent node of the blocking state binary tree if the state of the current parent node of the blocking state binary tree is a fourth state, and map the new current parent node of the blocking state binary tree back to the corresponding current parent node of the usage state binary tree.

The cache line obtaining module 905 is configured to repeat the steps of selecting the current parent node of the usage state binary tree and selecting the current parent node of the blocking state binary tree until there is no child node in the current parent node of the usage state binary tree to obtain the cache line to be replaced in the blocking cache system.

In an embodiment, the state checking module 901 is further configured to determine that no cache line can be replaced in the blocking cache system if the state of the root node of the usage state binary tree is a second state, and continue to check the state of the root node of the usage state binary tree.

In an embodiment, the states of the nodes in the usage state binary tree are determined according to the replaceable states of the cache lines in the blocking cache system.

In an embodiment, the states of the nodes in the blocking state binary tree are determined according to the states of the nodes in the replacement state binary tree corresponding to the blocking cache system and the replaceable states of the cache lines in the blocking cache system.

In an embodiment, the device further includes a state updating module configured to update the states of the nodes in the usage state binary tree and the blocking state binary tree after the cache line to be replaced in the blocking cache system is selected.

The above modules of the device for selecting the cache line to be replaced may be implemented in whole or in part by software, hardware, and combinations thereof. Each of the above modules may be embedded in or independent of a processor in a computer device in a form of hardware, or may be stored in a memory of the computer device in a form of software, so as to be called by the processor to perform the operations corresponding to the above modules.

Those skilled in the art can understand that all or part of the processes of the methods of the above embodiments can be implemented by instructing relevant hardware through a computer program, and the computer program can be stored in a non-transitory computer-readable storage medium. When the computer program is executed, it can implement the processes of the aforementioned embodiments of the methods. Any reference to a memory, a database or other media used in the embodiments provided in the present disclosure may include at least one of a non-transitory memory and a transitory memory. The non-transitory memory may include a Read-Only Memory (ROM), a magnetic tape, a floppy disk, a flash memory, an optical memory, a high-density embedded non-transitory memory, a resistive memory (ReRAM), a Magnetoresistive Random Access Memory (MRAM), a Ferroelectric Random Access Memory (FRAM), a Phase Change Memory (PCM), or a graphene memory, etc. The transitory memory may include a Random Access Memory (RAM), an external cache memory, or the like. By way of illustration and not limitation, the RAM may be in various forms, such as a Static Random Access Memory (SRAM) or a Dynamic Random Access Memory (DRAM). The database involved in the embodiments provided in the present disclosure may include at least one of a relational database or a non-relational database. The non-relational database may include a blockchain-based distributed database, etc., but is not limited thereto. The processors involved in the embodiments provided in present disclosure may be general-purpose processors, central processing units, graphics processors, digital signal processors, programmable logic devices, data processing logic devices based on quantum computing, etc., and is not limited.

In an embodiment, a non-transitory computer readable storage medium is provided. The non-transitory computer readable storage medium stores a computer program, the steps of the method for selecting the cache line to be replaced in the above embodiments are implemented when the computer program is executed by at least one processor. The features of the steps of the method can be referred to the above embodiments, and will not be repeated.

The technical features in the above embodiments may be randomly combined. In order to make the description concise, not all possible combinations of the technical features in the above embodiments are described. However, all the combinations of the technical features should be considered as falling within the scope of the specification as long as there is no contradiction.

The above-mentioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements may be made, which all fall within the protection scope of the present disclosure. Therefore, the scope of protection of the present disclosure shall be subject to the appended claims.

What is claimed is:

1. A method for selecting and replacing a cache line to be replaced, the method being applied to a blocking cache system, the blocking cache system comprising a plurality of cache lines and storing information of states of a usage state binary tree and a blocking state binary tree, the method comprising:

step (1): checking a state of a root node of a usage state binary tree corresponding to the blocking cache system, wherein the usage state binary tree comprises a plurality of nodes, the plurality of nodes forming a plurality of ways in a form of a binary tree, each of the ways corresponding to one cache line of the blocking cache system, and a state of each node of the usage state binary tree is determined according to a replaceable state of a corresponding cache line of the blocking cache system; the blocking state binary tree comprises a plurality of nodes, and the nodes of the blocking state binary tree are mapped in one-to-one correspondence with the nodes of the usage state binary tree, the plurality of nodes of the blocking state binary tree forming a plurality of second ways in a form of a binary tree, each of the second ways corresponds to one cache line of the blocking cache system, and states of the nodes of each of the ways are determined based on the states of the corresponding nodes of the usage state binary tree and the replaceable state of the corresponding cache line;

step (2): taking the root node of the usage state binary tree as a current parent node of the usage state binary tree on a condition that the state of the root node of the usage state binary tree is a first state, step (3): determining a new current parent node of the usage state binary tree by using the usage state binary tree and the blocking state binary tree, wherein a second method for determining the new current parent node of the usage state binary tree is selected from the following:

taking a left child node of the current parent node of the usage state binary tree as a new current parent node of the usage state binary tree on a condition that a state of the left child node and a right child node of the current parent node of the usage state binary tree is a first substate, taking the right child node of the current parent node of the usage state binary tree as the new current parent node of the usage state binary tree on a condition that the state of the left and right child nodes of the current parent node of the usage state binary tree is a second substate, and mapping the current parent node of the usage state binary tree to a corresponding current parent node of a blocking state binary tree corresponding to the blocking cache system on a condition that the state of the left and right child nodes of the current parent node of the usage state binary tree is a third substate, taking a left child node of the current parent node of the blocking state binary tree as a new current parent node of the blocking state binary tree on a condition that a state of the current parent node of the blocking state binary tree is a third state, taking a right child node of the current parent node of the blocking state binary tree as the new current parent node of the blocking state binary tree on a condition that the state of the current parent node of the blocking state binary tree is a fourth state, and mapping the new current parent node of the blocking state binary tree back to the corresponding current parent node of the usage state binary tree, wherein the current parent node of the usage state binary tree corresponding to the new current parent node of the blocking state binary tree is taken as the new current parent node of the usage state binary tree;

repeating the step (3) until there is no child node in the current parent node of the usage state binary tree, and selecting the cache line corresponding to the way that corresponds to the current parent node of the usage state binary tree as the cache line to be replaced in the blocking cache system;

step (4): updating states of the nodes of the usage state binary tree which forms the way corresponding to the selected cache line to be replaced stored in the blocking cache system and updating states of the nodes of the blocking state binary tree corresponding to the selected cache line to be replaced stored in the blocking cache system after the cache line to be replaced in the blocking cache system is selected; and step (5): determining that a request entering the blocking cache system finds no match in cached data and is sent to the memory, and in response, replacing the cache line to be replaced determined by using the usage state binary tree and the blocking state binary tree with data returned from memory.

2. The method according to claim 1, after checking the state of the root node of the usage state binary tree corresponding to the blocking cache system, the method further comprising:

determining that no cache line can be replaced in the blocking cache system and continuing to check the state of the root node of the usage state binary tree on a condition that the state of the root node of the usage state binary tree is a second state.

3. A device for selecting a cache line to be replaced, comprising:

one or more memories, the one or more memories storing information of states of a usage state binary tree and a blocking state binary tree; and one or more processors, wherein one or more programs are stored in the one or more memories, and when the one or more programs are executed by the one or more processors, a method of selecting a cache line to be replaced is performed, which comprises:

step (1): checking a state of a root node of a usage state binary tree corresponding to a blocking cache system, wherein the usage state binary tree comprises a plurality of nodes, the plurality of nodes forming a plurality of ways in a form of a binary tree, each of the ways corresponding to one cache line of the blocking cache system, and a state of each node of the usage state binary tree is determined according to a replaceable state of a corresponding cache line of the blocking cache system; the blocking state binary tree comprises a plurality of nodes, and the nodes of the blocking state binary tree are mapped in one-to-one correspondence with the nodes of the usage state binary tree, the plurality of nodes of the blocking state binary tree forming a plurality of second ways in a form of a binary tree, each of the second ways corresponds to one cache line of the blocking cache system, and states of the nodes of each of the ways are determined based on the states of the corresponding nodes of the usage state binary tree and the replaceable state of the corresponding cache line;

step (2): taking the root node of the usage state binary tree as a current parent node of the usage state binary tree on a condition that the state of the root node of the usage state binary tree is a first state, step (3): determining a new current parent node of the usage state binary tree by using the usage state binary tree and the blocking state binary tree, wherein a second method for determining the new current parent node of the usage state binary tree is selected from the following:

taking a left child node of the current parent node as the new current parent node of the usage state binary tree on a condition that a state of the left child node and a right child node of the current parent node of the usage state binary tree is a first substate, taking the right child node of the current parent node as the new current parent node of the usage state binary tree on a condition that the state of the left and right child nodes of the current parent node of the usage state binary tree is a second substate, and mapping the current parent node of the usage state binary tree to the corresponding current parent node of the blocking state binary tree corresponding to the blocking cache system on a condition that the state of the left and right child node of the current parent node of the usage state binary tree is a third substate, taking the left child node of the current parent node of the blocking state binary tree as the new current parent node of the blocking state binary tree on a condition that the state of the current parent node of the blocking state binary tree is a third state, taking the right child node of the current parent node of the blocking state binary tree as the new current parent node of the blocking state binary tree on a condition that the state of the current parent node of the blocking state binary tree is a fourth state, and mapping the new current parent node of the blocking state binary tree back to the corresponding current parent node of the usage state binary tree, wherein the current parent node of the usage state binary tree corresponding to the new current parent node of the blocking state binary tree is taken as the new current parent node of the usage state binary tree;

repeating the step (3) until there is no child node in the current parent node of the usage state binary tree, and selecting the cache line corresponding to the way that corresponds to the current parent node of the usage state binary tree as the cache line to be replaced in the blocking cache system;

step (4): updating states of the nodes of the usage state binary tree which forms the way corresponding to the selected cache line to be replaced stored in the one or more memories and updating states of the nodes of the blocking state binary tree corresponding to the selected cache line to be replaced stored in the one or more memories after the cache line to be replaced in the blocking cache system is selected; and step (5): determining that a request entering the blocking cache system finds no match in cached data and is sent to the memory, and in response, replacing the cache line to be replaced determined by using the usage state binary tree and the blocking state binary tree with data returned from memory.

4. The device according to claim 3, wherein the method further comprises:
   determining that no cache line can be replaced in the blocking cache system and continuing to check the state of the root node of the usage state binary tree on a condition that the state of the root node of the usage state binary tree is a second state.

5. A non-transitory computer-readable storage medium, on which a computer program is stored, wherein when the computer program is executed by at least one processor, a method of selecting a cache line to be replaced is performed, the method comprises:
   step (1): checking a state of a root node of a usage state binary tree corresponding to a blocking cache system, wherein the usage state binary tree comprises a plurality of nodes, the plurality of nodes forming a plurality of ways in a form of a binary tree, each of the ways corresponding to one cache line of the blocking cache system, and a state of each node of the usage state binary tree is determined according to a replaceable state of a corresponding cache line of a blocking cache system; a blocking state binary tree comprises a plurality of nodes, and the nodes of the blocking state binary tree are mapped in one-to-one correspondence with the nodes of the usage state binary tree, the plurality of nodes of the blocking state binary tree forming a plurality of second ways in a form of a binary tree, each of the second ways corresponds to one cache line of the blocking cache system, and states of the nodes of each of the ways are determined based on the states of the corresponding nodes of the usage state binary tree and the replaceable state of the corresponding cache line;
   step (2): taking the root node of the usage state binary tree as a current parent node of the usage state binary tree on a condition that the state of the root node of the usage state binary tree is a first state,
   step (3): determining a new current parent node of the usage state binary tree by using the usage state binary tree and the blocking state binary tree, wherein a second method for determining the new current parent node of the usage state binary tree is selected from the following:
      taking a left child node of the current parent node of the usage state binary tree as the new current parent node of the usage state binary tree on a condition that a state of the left child node and a right child node of the current parent node of the usage state binary tree is a first substate,
      taking the right child node of the current parent node of the usage state binary tree as the new current parent node of the usage state binary tree on a condition that the state of the left and right child nodes of the current parent node of the usage state binary tree is a second substate, and
      mapping the current parent node of the usage state binary tree to a corresponding current parent node of the blocking state binary tree corresponding to the blocking cache system on a condition that the state of the left and right child nodes of the current parent node of the usage state binary tree is a third substate, taking a left child node of the current parent node of the blocking state binary tree as a new current parent node of the blocking state binary tree on a condition that a state of the current parent node of the blocking state binary tree is a third state, taking a right child node of the current parent node of the blocking state binary tree as the new current parent node of the blocking state binary tree on a condition that the state of the current parent node of the blocking state binary tree is a fourth state, and mapping the new current parent node of the blocking state binary tree back to the corresponding current parent node of the usage state binary tree, wherein the current parent node of the usage state binary tree corresponding to the new current parent node of the blocking state binary tree is taken as the new current parent node of the usage state binary tree;
   repeating the step (3) until there is no child node in the current parent node of the usage state binary tree, and selecting the cache line corresponding to the way that corresponds to the current parent node of the usage state binary tree as the cache line to be replaced in the blocking cache system;
   step (4): updating states of the nodes of the usage state binary tree which forms the way corresponding to the selected cache line to be replaced and updating states of the nodes of the blocking state binary tree corresponding to the selected cache line to be replaced after the cache line to be replaced in the blocking cache system is selected; and
   step (5): determining that a request entering the blocking cache system finds no match in cached data and is sent to the memory, and in response, replacing the cache line to be replaced determined by using the usage state binary tree and the blocking state binary tree with data returned from memory.

6. The non-transitory computer-readable storage medium according to claim 5, wherein after checking the state of the root node of the usage state binary tree corresponding to the blocking cache system, the method further comprises:
   determining that no cache line can be replaced in the blocking cache system and continuing to check the state of the root node of the usage state binary tree on a condition that the state of the root node of the usage state binary tree is a second state.

* * * * *